(12) United States Patent
Nakamura

(10) Patent No.: US 7,379,086 B2
(45) Date of Patent: May 27, 2008

(54) POLYGON MIRROR UNIT HAVING A SEAL MEMBER WITH SLITS POSITIONED BETWEEN A CENTRAL PORTION AND A PERIPHERAL PORTION

(75) Inventor: Takaji Nakamura, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 231 days.

(21) Appl. No.: 11/412,974

(22) Filed: Apr. 28, 2006

(65) Prior Publication Data

US 2006/0192844 A1    Aug. 31, 2006

Related U.S. Application Data

(63) Continuation of application No. 10/456,527, filed on Jun. 9, 2003, now abandoned.

(51) Int. Cl.
*B41J 15/14* (2006.01)
*B41J 27/00* (2006.01)
(52) U.S. Cl. ...................... 347/257; 347/242
(58) Field of Classification Search ........ 347/242–245, 347/256–261, 263; 358/296
See application file for complete search history.

(56) References Cited

U.S. PATENT DOCUMENTS 4,868,673 A * 9/1989 Negoro ........................ 358/296

6,172,786 B1    1/2001 Fujita et al.
6,802,910 B2    10/2004 Murakami et al.

FOREIGN PATENT DOCUMENTS

| JP | 55-146254 A | 11/1980 |
| JP | 11-223792 A | 8/1999 |
| JP | 11-245442 A | 9/1999 |
| JP | 2000098287 A * | 4/2000 |

* cited by examiner

*Primary Examiner*—Hai C Pham
(74) *Attorney, Agent, or Firm*—Foley & Lardner LLP

(57) ABSTRACT

The present invention provides a laser unit using a seal member whose central and peripheral portions will not affect each other to produce strain during mounting and which can be handled as a single component.

In the laser unit 100 according to the present invention, a central portion 41 and a peripheral portion 42 of a seal member 40 used are separated from each other by slits 43. Therefore, when the seal member 40 is mounted, the central and peripheral portions will not affect each other to increase strain. In addition, because the central and peripheral portions are connected to each other at several points by bridging portions 44, the seal member 40 can be handled as a single component, which is very convenient.

19 Claims, 4 Drawing Sheets

POLYGON MIRROR UNIT HAVING A SEAL MEMBER WITH SLITS POSITIONED BETWEEN A CENTRAL PORTION AND A PERIPHERAL PORTION

The present application is a continuation of U.S. application Ser. No. 10/456,527, filed Jun. 9, 2003 now abandoned, which the entire contents of which are incorporated herein by reference.

BACKGROUND OF THE INVENTION

1. Field of the Invention

The present invention relates to a laser unit used for image formation in a copying machine or the like. More particularly, the present invention relates to a laser unit capable of preventing vibration of a polygon motor and also capable of preventing dust from entering the inside of a polygon cover.

2. Description of the Related Art

FIG. 5 is a sectional view showing an example of a conventional laser unit used for image formation in a copying machine or the like. The laser unit 300 has a polygon motor 20 assembled on a lower housing 10. The laser unit 300 further has a polygon mirror 30, a seal member 80, and a polygon cover 50. The body of the polygon motor 20 is provided with a motor mounting flange 21 for securing the polygon motor 20 to the lower housing 10. The polygon mirror 30 is attached to the rotating shaft of the polygon motor 20. The motor mounting flange 21 is secured to the lower housing 10 with screws 22 in such a manner that the seal member 80 (FIG. 6; thickness=H+ΔH) disposed on the lower housing 10 is sandwiched between the motor mounting flange 21 and the lower housing 10. In this case, each screw 22 is secured to a mounting shaft (not shown) projecting with a predetermined height H from the upper surface of the lower housing 10. The central portion of the seal member 80 is compressed by ΔH in the direction of thickness thereof. The central portion of the seal member 80 prevents the generation and propagation of vibration of the polygon motor 20. The polygon cover 50 is secured to mounting shafts 15 projecting with a predetermined height H from the upper surface of the lower housing 10. At this time, the lower peripheral portion of the polygon cover 50 sandwiches the peripheral portion of the seal member 80 between itself and the lower housing 10 to seal the inside of the polygon cover 50 from the outside, thereby preventing dust from entering the inside of the polygon cover 50.

In the above-described conventional laser unit, the seal member is formed in a single monolithic structure, as shown in FIG. 6, extending continuously from the polygon motor mounting portion to the polygon cover mounting portion. Therefore, if strain is produced in the polygon motor mounting portion by mounting of the polygon motor, the strain has an influence also on the peripheral portion of the seal member. If the polygon cover is mounted in this state, the hermeticity in the polygon cover may be degraded, and strain produced by mounting of the polygon cover may have an influence also on the central portion of the seal member. One approach to solve the above-described problem is to separate the central and peripheral portions of the seal member as shown in FIGS. 7A and 7B. With this technique, the amount of strain decreases. However, the handling and assembly of the seal member are troublesome because it comprises two separate parts. In another conventional example, vibration prevention for the polygon motor is made, but dust prevention for the polygon mirror is effected simply by bringing the polygon cover into close contact with the frame, without using a seal member, as in the invention disclosed in Japanese Patent Application Unexamined Publication (KOKAI) No. Hei 11-245442.

SUMMARY OF THE INVENTION

The present invention was made to solve the above-described problems. Accordingly, an object of the present invention is to provide a laser unit using a seal member that can be handled as a single component for both the polygon motor and the polygon cover and that is free from the problem that the central and peripheral portions of the seal member affect each other to produce strain when the seal member is mounted.

To solve the above-described problem, the present invention provides a laser unit comprising a lower housing; a polygon motor secured to the lower housing; a seal member having a central portion and a peripheral portion, the central portion being interposed between a motor mounting flange of the polygon motor and the lower housing, and the peripheral portion extending outside the motor mounting flange; and a polygon cover for covering both the polygon mirror and the polygon motor, the polygon cover being secured at an edge portion thereof to the lower housing in such a manner that the peripheral portion of the seal member is interposed between the edge portion of the polygon cover and the lower housing. The seal member is provided with slits at appropriate positions between the central portion and the peripheral portion. The central portion and the peripheral portion are connected to each other by bridging portions formed between the slits.

DESCRIPTION OF THE PREFERRED EMBODIMENTS

Figure 1:
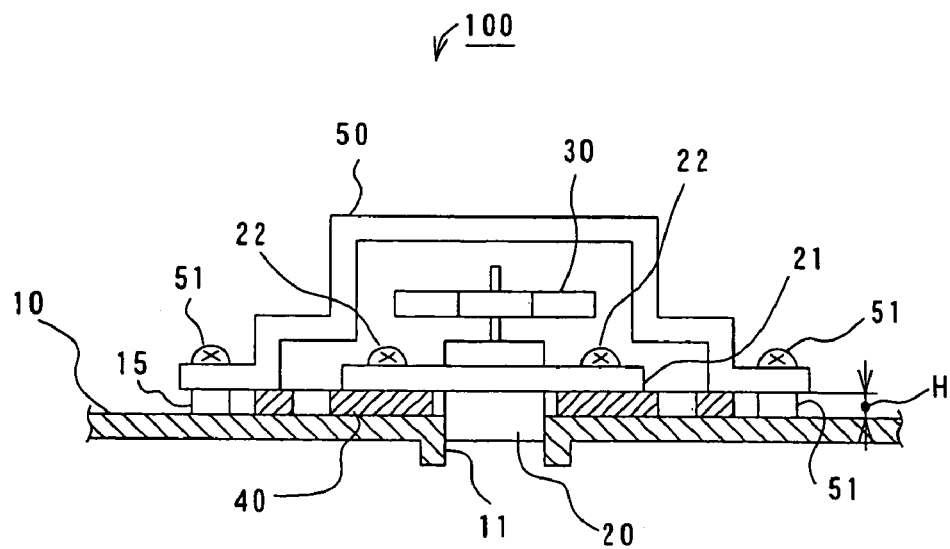
FIG. 1 is a sectional view showing an embodiment of the laser unit according to the present invention.
Figure 2:
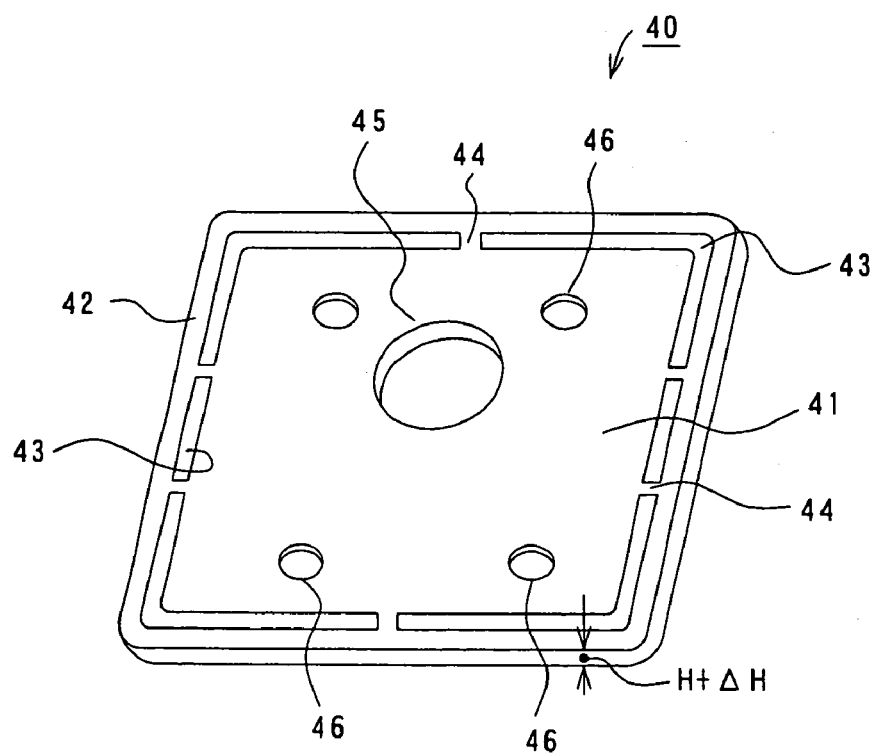
FIG. 2 is an external view for illustrating in detail a seal member used in the laser unit shown in FIG. 1.
Figure 3:
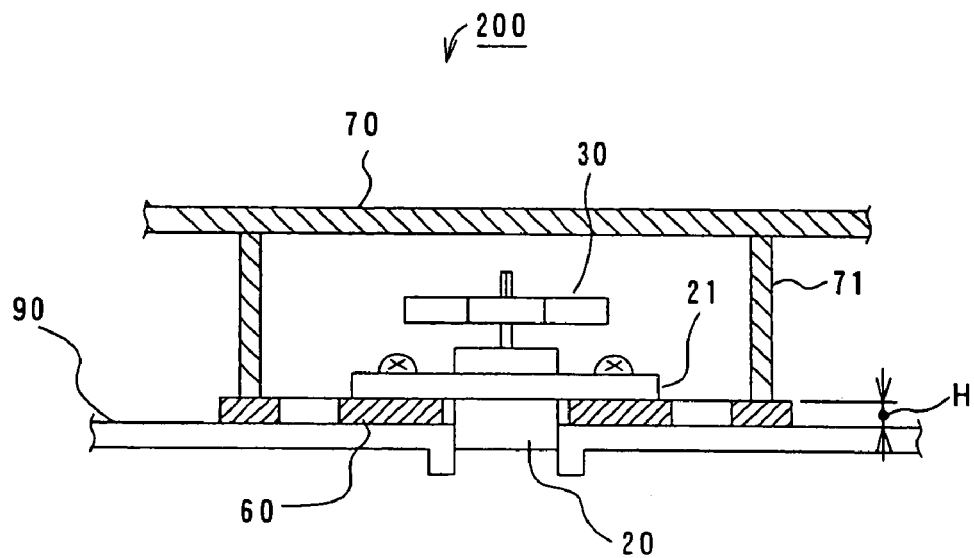
FIG. 3 is a sectional view showing another embodiment of the laser unit according to the present invention.
Figure 4:
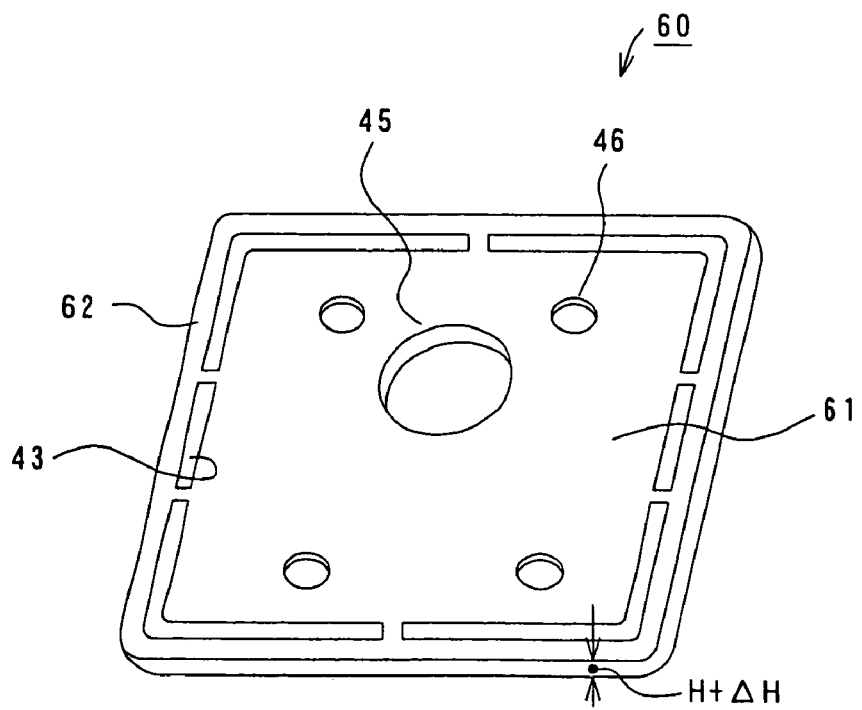
FIG. 4 is an external view for illustrating in detail a seal member used in the laser unit shown in FIG. 3.
Figure 5:
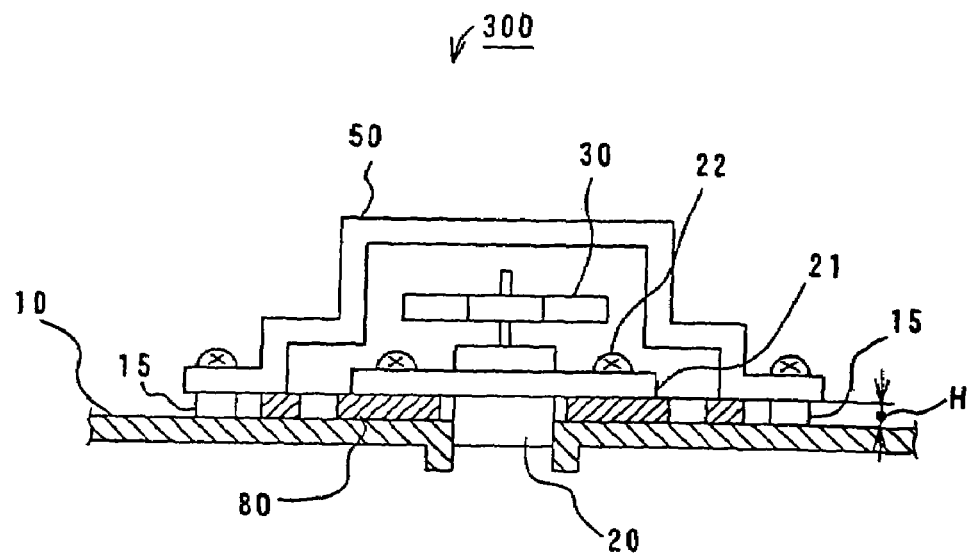
FIG. 5 is a sectional view showing an example of a conventional laser unit.
Figure 6:
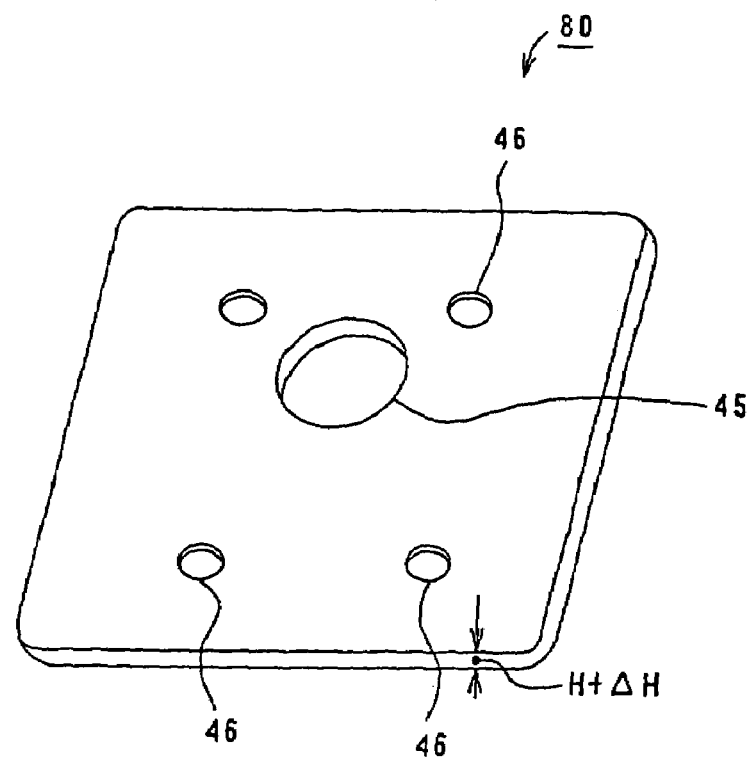
FIG. 6 is an external view for illustrating a seal member used in the laser unit shown in FIG. 5.
Figure 7A:
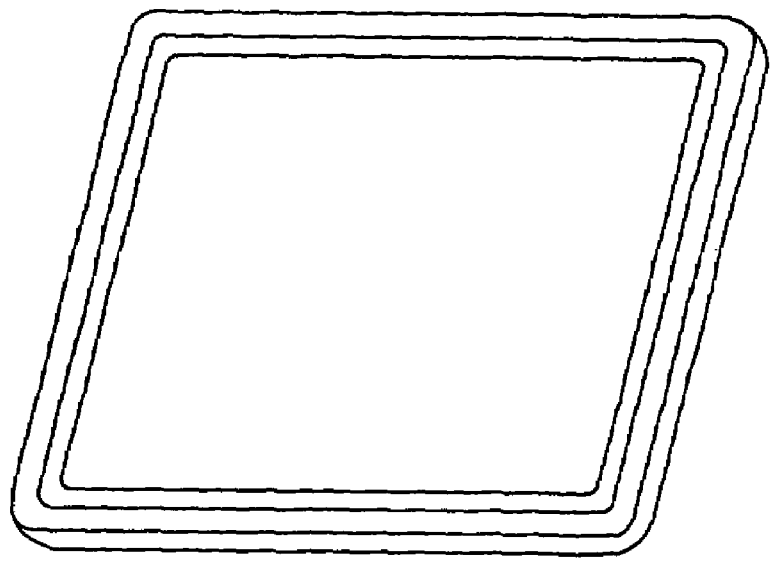
FIG. 7 is an external view for illustrating another example of a seal member used in the laser unit shown in FIG. 5.
Figure 7B:
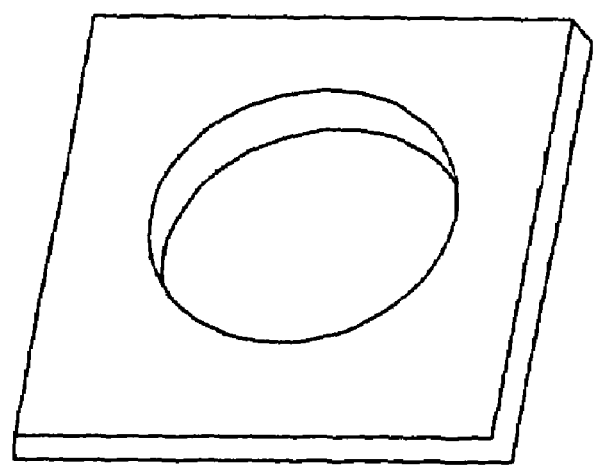

Embodiments of the present invention will be described below with reference to the accompanying drawings. FIG. 1 is a sectional view showing an embodiment of the laser unit according to the present invention. FIG. 2 is an external view for illustrating in detail a seal member used in the laser unit shown in FIG. 1. FIG. 3 is a sectional view showing another embodiment of the laser unit according to the present invention. FIG. 4 is an external view for illustrating in detail a seal member used in the laser unit shown in FIG. 3. The laser unit shown in FIG. 3 differs from the laser unit shown in FIG. 1 mainly in that it has a seal member with a widened peripheral portion and an upper housing in place of the seal member and the polygon cover of the laser unit in FIG. 1, and that the mounting shafts of the lower housing are altered in design from those of the laser unit in FIG. 1. The other features are substantially common to the two laser units.

The laser unit 100 shown in FIG. 1 is used for image formation in a copying machine or the like. The laser unit 100 has a polygon motor 20 assembled on a lower housing 10. The laser unit 100 further has a polygon mirror 30, a seal member 40, and a polygon cover 50. The lower housing 10 has a motor mounting hole 11 in a central portion thereof. The bottom portion of the polygon motor 20 is fitted in the motor mounting hole 11. The body of the polygon motor 20 is provided with a motor mounting flange 21 for securing the polygon motor 20 to the lower housing 10. The polygon mirror 30 is attached to the rotating shaft of the polygon motor 20. The motor mounting flange 21 is secured to the lower housing 10 with screws 22 in such a manner that the central portion of the seal member 40 (see FIG. 2; thickness=H+ΔH) disposed on the lower housing 10 is sandwiched between the motor mounting flange 21 and the lower housing 10. In this case, each screw 22 is secured to a mounting shaft (not shown) projecting with a predetermined height H from the upper surface of the lower housing 10.

As shown in FIG. 2, the seal member 40 is quadrangular and has a central portion 41, a peripheral portion 42 and bridging portions 44. The central portion 41 and the peripheral portion 42 are mostly divided from each other by slits 43. However, the central portion 41 and the peripheral portion 42 are connected to each other at several points by the bridging portions 44, which cross the slits 43. The central portion 41 is provided with a motor mounting hole 45 for mounting the motor and also provided with screw mounting holes 46 for mounting the screws 22. As the seal member 40, a sealing medium having a predetermined elasticity and further having dust-proof and vibration-proof capabilities is used. For example, it is preferable to use a seal member made of so-called rubber sponge [P-PET (plastic polyethylene terephthalate) or PETP (ISO)] or expanded urethane foam and having a density of the order of 180±40 kg/m$^3$ and a hardness of the order of 10±5°. The material is preferably of the closed-cell type.

As has been stated above, the motor mounting flange 21 sandwiches the central portion 41 of the seal member 40 between itself and the lower housing 10, and the screws 22 are secured to the lower housing 10 through the respective screw mounting holes 46. In this case, the central portion 41 of the seal member 40 is compressed by "ΔH" in the thickness direction because the thickness thereof is "H+ΔH", and secured in the compressed state. Next, the polygon cover 50 is placed over the polygon motor 20 and secured with screws 51 to the mounting shafts 15 projecting with a predetermined height H from the upper surface of the lower housing 10. Consequently, the lower peripheral portion of the polygon cover 50 sandwiches the peripheral portion 42 of the seal member between itself and the lower housing 10 to seal the inside of the polygon cover 50 from the outside, thereby preventing dust from entering the inside of the polygon cover 50. In this case also, when the polygon cover 50 is secured to the lower housing 10 with the screws 51, the peripheral portion 42 of the seal member 40 is compressed by "ΔH" in the thickness direction, and secured in the compressed state.

Thus, both the central portion 41 and the peripheral portion 42 of the seal member 40 are compressed by a predetermined amount. Therefore, the seal member 40 is capable of preventing the generation and transmission of vibration of the polygon motor 30 and also capable of surely preventing dust from entering the inside of the polygon cover 50. Further, the seal member 40 is separated into the central portion 41 and the peripheral portion 42, which are connected to each other only at the bridging portions 44. Therefore, it is possible to minimize the mutual transmission of strain produced in the central portion 41 and the peripheral portion 42 during the mounting process. On the other hand, the central portion 41 and the peripheral portion 42 are connected to each other by the bridging portions 44. Therefore, the seal member 40 can be handled as a single component, which is very convenient. Further, because the securing process is carried out by using screws, double-sided adhesive tape is not needed. Thus, the process is facilitated. In this example, the central portion 41 and the peripheral portion 42 of the seal member 40 have the same thickness with a view to facilitating the processing operation. However, if it is desired to vary the thickness of the seal member 40 at the central portion 41 and the peripheral portion 42 from the structural point of view, a molding process using a mold should preferably be carried out. Although it has been stated above that the foregoing arrangement allows the laser unit to be assembled without the need of double-sided adhesive tape, it is a matter of course that double-sided adhesive tape may be applied to at least one side of the seal member to further facilitate the assembling process. Further, it is also preferable that Mylar sheet with the same configuration as that of the seal member should be attached to one side of the seal member that faces the lower housing for reinforcing purposes.

Another embodiment of the present invention will be described below with reference to FIGS. 3 and 4. A laser unit 200 shown in FIG. 3 differs from the laser unit shown in FIG. 1 mainly in that it uses a seal member 60 with a widened peripheral portion and an upper housing 70 in place of the seal member and the polygon cover used in the laser unit in FIG. 1, and that the mounting shafts of the lower housing 90 are altered in position from those of the laser unit in FIG. 1. The other features are substantially common to the two laser units.

It has been set that when the upper housing 70 is secured to the lower housing 90 by mounting means (not shown), the space between the lower end of a partition 71 of the upper housing 70 and the surface of the lower housing 90 will be "H". The thickness of a seal member 60 shown in FIG. 4 and the configuration of a central portion 61 thereof are the same as in the case of the seal member 40 shown in FIG. 2 and the central portion 41 thereof. However, a peripheral portion 62 of the seal member 60 is widened in accordance with the thickness of the partition 71 of the upper housing 70. The function performed by the seal member 60 and the upper housing 70 is the same as in the case of FIG. 1.

As has been stated above, the embodiment of the present invention discloses a laser unit having a polygon mirror and a polygon motor equipped with the polygon mirror and a motor mounting flange, wherein the motor mounting flange is secured to a lower housing in such a manner that a central portion of a seal member comprising an elastic member is sandwiched between the motor mounting flange and the lower housing. Further, a polygon cover for sealing the polygon mirror attached to the polygon motor from the outside is secured to the lower housing in such a manner that a peripheral portion of the seal member is sandwiched between the polygon cover and the lower housing, thereby preventing vibration of the polygon motor and also preventing dust from entering the inside of the polygon cover. The central and peripheral portions of the seal member are separated from each other by slits except at several points where the central and peripheral portions are connected to each other by bridging portions.

The laser unit according to the present invention is arranged as stated above. That is, the central and peripheral portions of the seal member are separated from each other by the slits. Therefore, the central portion and the peripheral portion do not affect each other much when the seal member is mounted. Accordingly, strain is unlikely to occur. In addition, because the central and peripheral portions are connected to each other at several points by the bridging portions, the seal member can be handled as a single component, which is very convenient. Hence, it is possible to prevent the generation and propagation of vibration of the polygon motor and also prevent dust from entering the inside of the polygon cover.

What is claimed is:

1. A polygon mirror unit comprising:
   a lower housing;
   a polygon motor secured to said lower housing;
   a seal member having a central portion and a peripheral portion, said central portion being interposed between a motor mounting flange of said polygon motor and said lower housing, and said peripheral portion extending outside said motor mounting flange; and
   a cover arranged to cover both said polygon mirror and said polygon motor, said cover being secured at an edge portion thereof to said lower housing in such a manner that said peripheral portion of said seal member is interposed between the edge portion of said cover and said lower housing;
   wherein said seal member is provided with slits at appropriate positions between said central portion and said peripheral portion, said central portion and said peripheral portion being connected to each other by bridging portions formed between said slits.

2. A polygon mirror unit according to claim 1, wherein said seal member is an elastic member.

3. A polygon mirror unit according to claim 1, wherein said seal member is formed from rubber sponge.

4. A polygon mirror unit according to claim 3, wherein said seal member has a density of 180±30 kg/m$^3$ and a hardness of 10±5°.

5. A polygon mirror unit according to claim 3, wherein said seal member has double-sided adhesive tape for mounting applied to at least one side thereof.

6. A polygon mirror unit comprising:
   a motor that drives and rotates a polygon mirror and that has a flange extending from the outer circumferential surface of the motor toward the outside in a rotation radius direction, of the polygon mirror;
   a lower housing in which a hole portion is formed, the hole portion being formed for insertion of an end portion of the motor on the side on which the polygon mirror is not coupled to the motor;
   a cover so attached to the lower housing as to cover the polygon mirror and motor; and
   a seal member interposed between the flange, cover, and lower housing in a state where the cover is attached to the lower housing, the seal member having slits at adequate positions between peripheral and central portions thereof, and the central and peripheral portions being connected to each other by bridge portions formed between the slits, wherein
   the central portion of the seal member is interposed between the flange and lower housing, and the peripheral portion of the seal member is interposed between the edge portion of the cover and lower housing.

7. The polygon mirror unit according to claim 6, wherein the seal member has a hole formed at a portion corresponding to the hole portion formed in the lower housing.

8. The polygon mirror unit according to claim 6, wherein the flange of the motor is fixed to the lower housing by screws and the seal member has through holes for insertion of the screws.

9. The polygon mirror unit according to claim 6, wherein the lower housing has a projection portion projecting from a surface on a side of the lower housing to which the cover is attached, and the cover is attached to the projection portion.

10. The polygon mirror unit according to claim 9, wherein a height of the projection portion from the surface of the lower housing is smaller than a thickness of the seal member.

11. The polygon mirror unit according to claim 10, wherein the seal member has a hole formed at a portion corresponding to the hole portion formed in the lower housing.

12. The polygon mirror unit according to claim 11, wherein the flange of the motor is fixed to the lower housing by screws through the seal member, and
   the seal member has through holes for insertion of the screws.

13. A polygon mirror unit comprising:
   driving means for driving and rotating a polygon mirror and that has a flange extending from the outer circumferential surface of the driving means toward the outside in a rotation radius direction, of the polygon mirror;
   a lower housing in which a hole portion is formed, the hole portion being formed for insertion of an end portion of the driving means on the side on which the polygon mirror is not coupled to the driving means;
   covering means attached to the lower housing for covering the polygon mirror and driving means; and
   sealing means for sealing the flange, covering means, and lower housing in a state where the covering means is attached to the lower housing, the sealing means having slits at adequate positions between peripheral and central portions thereof, and the central and peripheral portions being connected to each other by bridge portions formed between the slits, wherein
   the central portion of the sealing means is interposed between the flange and lower housing, and the peripheral portion of the sealing means is interposed between the edge portion of the covering means and lower housing.

14. The polygon mirror unit according to claim 13, wherein the sealing means has a hole formed at a portion corresponding to the hole portion formed in the lower housing.

15. The polygon mirror unit according to claim 13, wherein the flange of the driving means is fixed to the lower housing by screws and the sealing means has through holes for insertion of the screws.

16. The polygon mirror unit according to claim 13, wherein the lower housing has a projection portion projecting from a surface on a side of the lower housing to which the covering means is attached, and the covering means is attached to the projection portion.

17. The polygon mirror unit according to claim 16, wherein a height of the projection portion from the surface of the lower housing is smaller than a thickness of the sealing means.

18. The polygon mirror unit according to claim 17, wherein the sealing means has a hole formed at a portion corresponding to the hole portion formed in the lower housing.

19. The polygon mirror unit according to claim 18, wherein the flange of the driving means is fixed to the lower housing by screws through the sealing means, and the sealing means has through holes for insertion of the screws.

* * * * *